M. B. FRASER,

Assignor to WHITMAN & BURRELL.

Cheese Hoop.

No. 9,375. Reissued Sept. 14, 1880.

WITNESSES

Wm. C. Raymond.

E. Laass

INVENTOR

Milton B. Fraser per Duell, Laass & Hey

Attorneys

N. PETERS, PHOTO-LITHOGRAPHER, WASHINGTON, D. C.

UNITED STATES PATENT OFFICE.

MILTON B. FRASER, OF ROME, ASSIGNOR TO WHITMAN & BURRELL, OF LITTLE FALLS, NEW YORK.

CHEESE-HOOP.

SPECIFICATION forming part of Reissued Letters Patent No. 9,375, dated September 14, 1880.

Original No. 122,520, dated January 9, 1872. Application for reissue filed May 7, 1880.

*To all whom it may concern:*

Be it known that I, MILTON B. FRASER, of Rome, in the county of Oneida, in the State of New York, have invented new and useful Improvements in Cheese-Hoops, of which the following, taken in connection with the accompanying drawings, is a full, clear, and exact description.

This invention relates to certain peculiarities in the construction of a cheese-hoop, whereby the same is particularly adapted for use in connection with a gang-press, and caused to operate with great facility and with improved effects.

The invention is fully illustrated in the accompanying drawings, wherein—

Figure 3:
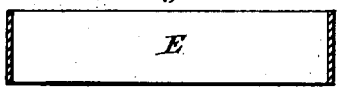
Figure 1:
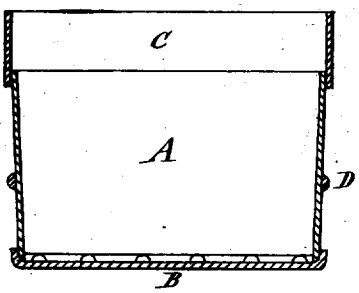
Figure 2:
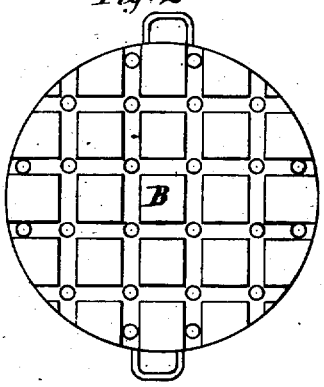
Figure 5:
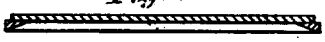
Figure 4:
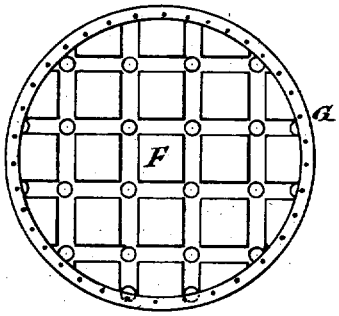
Figure 6:
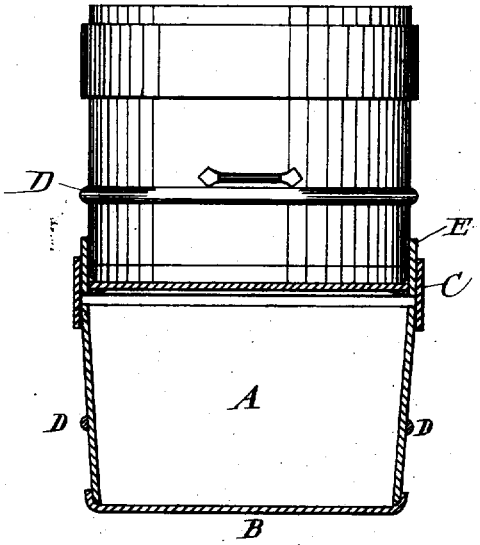

Figure 1 is a vertical section of my improved cheese-hoop; Fig. 2, a plan view of the bottom of same. Fig. 3 is a vertical section of the loose rim or bandager. Fig. 4 is a view of that side of the follower which faces the cheese, the obverse or upper side of same being similar to the form illustrated in Fig. 2. Fig. 5 is a transverse section of the follower, showing position of the elastic ring; and Fig. 6 is an exterior side view of the hoop in conjunction with a fellow hoop, shown sectionally, to illustrate the telescopic movement of same.

Similar letters of reference indicate corresponding parts.

A represents the main or lower section of the hoop into which the cheese is intended to be pressed, the said section being about one-fourth of an inch higher than the desired thickness of the cheese, and provided with a bottom, B, which is firmly secured thereto to facilitate the handling of the filled hoop, and is grooved and perforated, as shown in Figs. 1 and 2 of the drawings, or in such a form and contour as may be deemed expedient to facilitate the escape of the whey and air from the center to the circumference of the bottom. The said grooving can be made in any manner best suited to the material of which the bottom is composed.

The main section A is tapered toward the bottom, so as to render the external circumference of the latter smaller than the internal circumference of the top of said section, and thus allow the lower portion of same to enter the top of a fellow hoop of corresponding dimensions, for the purpose hereinafter demonstrated.

C is a straight cylindrical section about four inches in width, and fitted closely to the exterior of the top of section A, and riveted or firmly attached thereon. A hoop or band, D, is applied to the exterior of the section A, about midway its height, which serves as a shoulder or stop for the telescopic movement of said hoop in a fellow hoop, as aforesaid, and also supports the tapered end of the hoop, so as to bring the axis of the hoop in a horizontal position and in range with the plunger or screw of the press when placed in a horizontal gang-press.

E represents a loose rim of sheet metal rolled up and of such length that when applied to the interior of the upper section, C, of the hoop, the ends of said rim will nearly meet. The rim E is of sufficient width to allow for the whey accompanying the curd before it is pressed. The projection of said rim above the section C facilitates the handling of the former, and by turning the upper edge of same outward the follower is easily admitted.

A clasp-button or other suitable fastening may be attached, if necessary, near the upper edge and joint of the rim to hold the ends together while inserting it into its seat in the hoop.

F denotes the follower, which is applied to the top of the curd preparatory to expressing the whey therefrom, the said follower being grooved and perforated similar to the bottom B, to allow of a free escape of the whey at the upper end of the hoop. An elastic ring, G, attached in any suitably way near the edge of the follower, and projecting slightly over the same, prevents the formation of fins or rough edges on the cheese during the process of pressing. By attaching the elastic ring directly to the rim of the follower in the manner shown the said ring is held against the interior of the hoop with equal pressure at all points of its periphery, and the liability of its becoming displaced is obviated.

The manipulation and mode of using my improved cheese-hoop is as follows: First, a round cap-cloth is smoothly placed in the bottom of the hoop. Then the bandage-cloth is applied to the interior of the hoop by slipping the said cloth on the right wrist, taking the rim E and lapping the ends thereof about four inches, holding it thus with thumb and finger of left hand, catching under said thumb the edge of the bandage-cloth, and sweeping the same around the exterior of the rim. The rim being then allowed to expand, the bandage becomes engaged thereby and is evenly held thereon. The ends of the rim being next snapped together, the bandage is strained tight upon it, and then the rim, with the bandage thus attached, is inserted into its seat in the top of the hoop, the bandage being of sufficient length to cause it to more than touch the bottom of the hoop. The hoop is thus prepared for the reception of the curd. After the hoop is filled another cap-cloth is applied to the top of the curd and the follower upon the cap-cloth. A number of hoops being thus prepared for the press, the first is placed with its follower adjacent to the head-block on the end of the plunger or screw of the press, and then the remainder of the hoops are successively placed with their upper ends over the lower or small ends of the preceding hoops. When all the hoops are thus arranged in the press frame or bed the screw is applied. The hoops being allowed to move telescopic within one another, the pressure is transmitted from the first hoop throughout the entire series of hoops, and the process of pressing complete in one operation. After the pressing process the cheeses are removed from their respective hoops and the last edge of the bandage turned and greased down.

What I claim as my invention is—

1. A cheese-hoop having the external circumference of its lower portion smaller than the internal circumference of its upper portion, substantially as and for the purpose set forth.

2. A cheese-hoop made tapering toward the bottom and adapted to enter with the latter the top of a fellow hoop, and provided with a stop for limiting its said telescopic movement, substantially as set forth.

3. A cheese-hoop provided with a grooved and perforated bottom, in combination with a correspondingly grooved and perforated follower of a fellow hoop, as shown and described.

4. The bottom B and follower F of a cheese-hoop, grooved and perforated, substantially as shown, for the purpose set forth.

5. The combination of the section A, section C, attached to the exterior of the upper part of section A, and the loose rim E, substantially as and for the purpose set forth.

6. The combination of the section A, provided with the fixed bottom B and fixed upper section, C, loose rim E, and follower F, substantially in the manner described and shown.

7. The combination, with the tapered section A, provided with the cylindric top section, C, of the band D, substantially as described, and for the purpose specified.

In testimony whereof I have hereunto set my hand, at Rome, New York.

MILTON B. FRASER.

Witnesses:

HOMER T. FOWLER,
GEORGE W. G. KINNEY.